United States Patent
Wong

(10) Patent No.: US 10,268,551 B1
(45) Date of Patent: Apr. 23, 2019

(54) CLOUD SERVICE BACKUP SYSTEM

(71) Applicant: EMC Corporation, Hopkinton, MA (US)

(72) Inventor: Steven T. Wong, Cerritos, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 77 days.

(21) Appl. No.: 14/502,574

(22) Filed: Sep. 30, 2014

(51) Int. Cl.
 *G06F 12/00* (2006.01)
 *G06F 11/14* (2006.01)
 *G06F 3/06* (2006.01)

(52) U.S. Cl.
 CPC ........ *G06F 11/1464* (2013.01); *G06F 3/0604* (2013.01); *G06F 3/065* (2013.01); *G06F 3/067* (2013.01); *G06F 2003/0697* (2013.01)

(58) Field of Classification Search
 CPC .... G06F 11/1464; G06F 3/0604; G06F 3/065; G06F 3/067; G06F 2003/0697
 See application file for complete search history.

(56) References Cited

U.S. PATENT DOCUMENTS

2010/0332479 A1* 12/2010 Prahlad ............... G06F 17/3002 707/741

* cited by examiner

*Primary Examiner* — Matthew Bradley
(74) *Attorney, Agent, or Firm* — Peter Jovanovic; Krishnendu Gupta

(57) ABSTRACT

A method, article of manufacture, and system for cloud backups is discussed. Heterogeneous backup appliances may be deployed in a datacenter. Facades may interface these appliances with a backup management system.

9 Claims, 5 Drawing Sheets

CLOUD SERVICE BACKUP SYSTEM

FIELD OF THE INVENTION

This invention relates generally to cloud backups, and more particularly to systems and methods for backing up a tenant's data in a cloud service provider's environment.

BACKGROUND OF THE INVENTION

Traditional datacenters take backups from and store them on backup storage. These backups may later be used to restore data to various machines in an environment. There is presently a trend, however, to move data from local storage into the cloud. Cloud systems present unique backup challenges that are not presently addressed by traditional backup systems.

There is a need, therefore, for an improve method, system, and process for managing data backups in a cloud environment.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
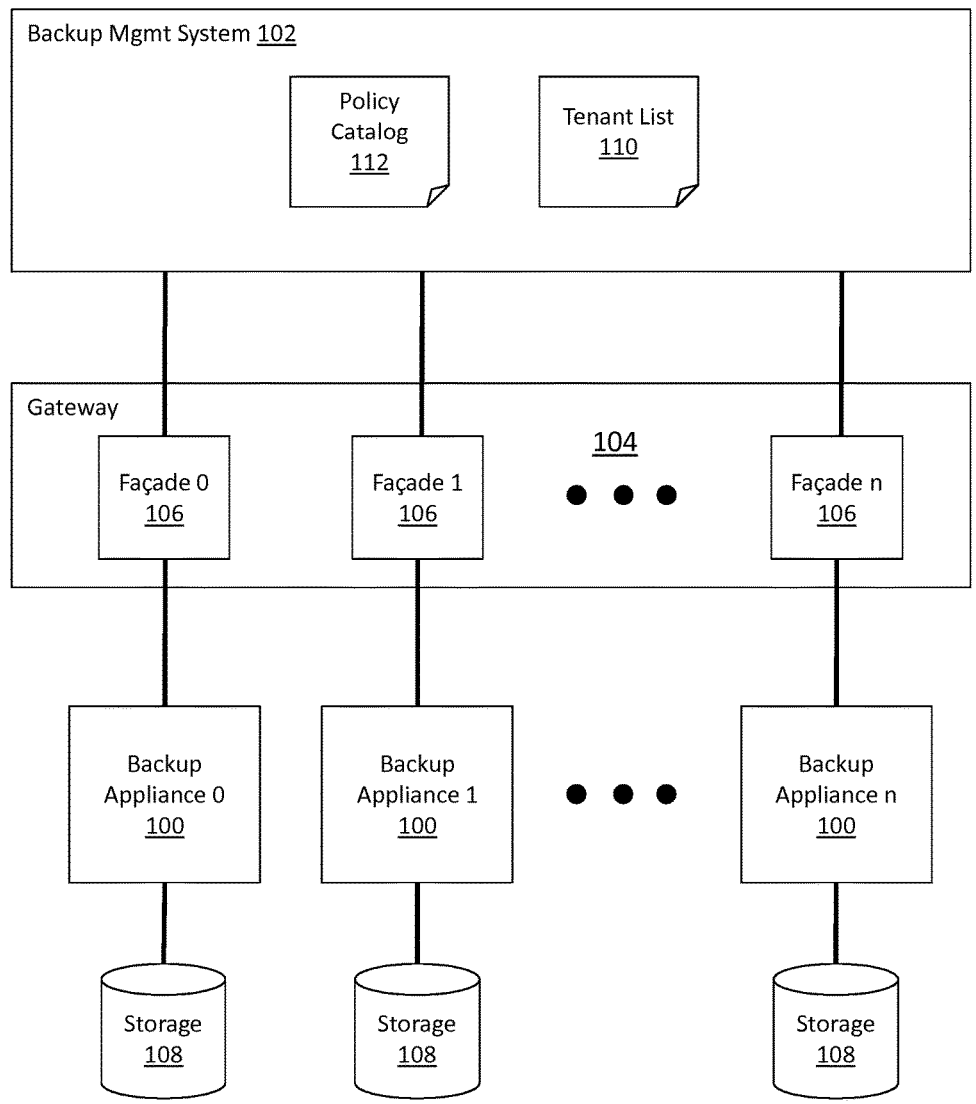
FIG. 1 depicts a cloud backup and recovery system consistent with an embodiment of the present disclosure.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

The present disclosure provides a system and methods for backing up tenant data in a cloud environment. The advent of the cloud has introduced novel backup challenges. Cloud scalability has resulted in cloud implementations far larger than traditional datacenters, and these implementations will continue to grow rapidly. For example, a cloud implementation may contain many petabytes or even exabytes of data. Further, unlike a traditional datacenter, this data may belong to a large number of cloud consumers (aka tenants).

Existing backup systems designed for a traditional datacenters may not be suitable for a cloud environment. They may have trouble scaling to appropriately accommodate the cloud. As different backup appliances are added to the environment to handle increasing workloads, an administrator may need to define new backup policies to accommodate API, version, hardware, or other changes between the newly added appliances and the existing appliances. Additionally, existing backup systems may be designed to backup data as a whole without distinguishing between individual tenants. This may be a problem, for example, if a tenant is using the cloud environment to store sensitive data that should not be comingled with another tenant's data. The methods and systems herein address these and other shortcoming.

The present disclosure solves these challenges by providing a common portal for managing backup appliances through one or more facades. The portal, also called a backup management system, may provide a common interface for managing tenants and backup policies or procedures. This backup management system may then interface with multiple backup appliances through façades. In an embodiment, each façade may be purposefully designed for a given backup appliance, but interact with the backup management system using a common API. This may allow multiple heterogeneous backup appliances to be easily added to the cloud environment.

FIG. 1 depicts a cloud backup system for backing-up data in a cloud service provider's environment. Backup management system 102 may manage multiple backup appliances 100 through gateway 104. Gateway 104 may comprise a plurality of facades 106 for receiving instructions from backup management system 102 and communicating them to backup appliances 100. In an embodiment, backup management system 102 may further comprise policy catalog 112 and tenant list 110, each of which is discussed in detail below.

Backup appliances 100 may comprise backup software operating on a physical machine, a virtual machine, and/or general-purpose computer. In an embodiment, backup appliances 100 may control backups taken from primary storage (not shown) and stored on backup storage, such as storage 108. For example, Backup Appliance 0 may be in communication with a primary storage device containing tenant data. In some embodiments, the primary storage device may contain an agent, daemon, or other process for assisting in the backup. The backup appliance's backup software may take a backup from the primary storage device and store it on storage 108.

Storage 108 may be any storage device capable of storing a backup. While FIG. 1 shows each appliance 100 with its own storage 108, in some embodiments one or more backup appliances may share the same storage. Additionally or alternatively, storage 108 may comprise deduplicated storage for conserving storage resources.

In some embodiments, backup appliances 100 may be heterogeneous. The heterogeneous appliances may comprise different machines, hardware, and/or software. Additionally or alternatively, different vendors may provide one or more of the appliances 100. In some embodiments, one or more of the appliances 100 may use different APIs or backup management tools.

Heterogeneous machines may not operate efficiently in a cloud environment. Cloud environments may expand rapidly, thereby requiring new backup appliances to be added frequently to accommodate increasing workloads. If each appliance uses a different management API, however, the backup process needs to be managed and configured for each appliance individually, or at best on each group of homogenous appliances. The present disclosure addresses these limitations.

Backup management system 102 may provide a common interface, tool, and/or API for managing multiple heterogeneous backup appliances, such as backup appliances 100. Backup management system may allow an administrator or other user to define backup procedures and policies for different tenants, backup appliances, or primary storage devices in the environment. These backup instructions may be communicated to backup appliances 100 through gateway 104.

In an embodiment, gateway 104 is a system comprising facades 106. Gateway 104 could be, for example, a physical or virtual machine, or a general-purpose computer. Facades 106 may comprise software modules that present a common interface to backup management system 102. This backup management system facing common interface may be the same on each façade, thereby allowing backup management system 102 to transmit backup instructions to the facades using a single interface. Facades may be developed specifically for, and/or to interact with, individual backup appliances. The facades may translate the instructions received through the common interface into instructions usable by each backup appliance's native APIs. For example, backup appliance 0 and backup appliance 1 may come from two different vendors and surface two different APIs. Façade 0 and façade 1 may receive common instructions from backup management 102 and manipulate the instructions accommodate the API differences. Façade 0 may then transmit the instructions to backup appliance 0 using that appliance's API, and Façade 1 may transmit them to backup appliance 1 using the other API.

In an embodiment, facades 106 may be developed specifically for backup appliances 100. Each appliance may have its own façade which contains logic for interfacing with that appliance's API. As new versions of the appliance are released, new facades may be provided to interface with the latest appliance. Additionally or alternatively, homogenous backup appliances may share a common façade since they interact with similar machines. For example, if a cloud service provider purchases five new backup appliances that are substantially similar to each other, these new appliances may all use the same façade. Substantial similar appliances could be, for example, the same machine, the same software version, or use the same API.

Facades 106 may also surface metrics provided by the heterogeneous backup appliances to backup management system 102. The heterogeneous backup appliances may provide API's or database query facilities for providing metrics, such as performance metrics, to an administrator. Backup management system 102 may transmit instructions to the facades to harvest the metrics. The facades may than translate those instructions, communicate them to the backup appliance APIs and/or database query facilities, and transmit the results back to the backup management system. In some embodiments, the facades may convert the metrics into a standardized format before transmitting them to the backup management system.

Figure 2:
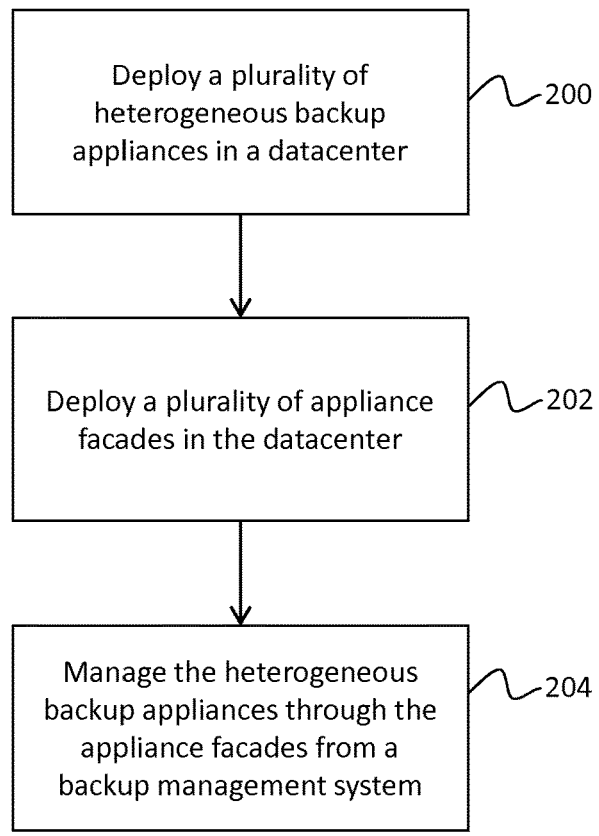
FIG. 2 depicts a flowchart for deploying and managing backup appliances consistent with an embodiment of the present disclosure.

Turning now to FIG. 2, a process for creating and managing the cloud backup system depicted in FIG. 1 is discussed. At block 200, a plurality of heterogeneous backup appliances may be deployed in a datacenter. The backup appliances could be, for example, substantially similar to backup appliances 100.

At 202, a plurality of appliance facades may be deployed in a datacenter. These facades could be substantially similar to facades 106. In an embodiment, the facades may be deployed on a gateway, such as gateway 104.

Finally, at 204, the backup appliances may be managed through appliance facades from a backup management system. This backup management system may be similar to backup management system 102. In some embodiments, managing the appliances may include transmitting instructions or policies to the appliances through the facades.

The system of FIG. 1 may also be used to promulgate tenant specific policies to various appliances in the environment. Tenants may require their backups be handled in a certain way. For example, one tenant may require weekly backups while another requires monthly backups. Additionally or alternatively, a tenant may require a dedicated appliance for performance or compliance purposes. Unfortunately, this may be cumbersome in an environment comprising heterogeneous appliances. Different appliances may have unique capabilities that are not shared with other machines. For example, different appliances produced by the same or different companies may have different features. Further, even if the appliances have the same features, the API for enabling or controlling those features may be different. The system of FIG. 1 may ease this burden an allow tenant specific policies to be efficiently promulgated to the heterogeneous appliances.

Backup management system 102 may comprise tenant list 110 and policy catalog 112. Tenant list 110 may include a record of every tenant using the cloud environment, or only a record of tenants who are subscribed to a backup service offered by the cloud service provider. In an embodiment the record is stored as data on a computer readable storage medium. In some embodiments, tenants stored in the tenant list may be subdivided. For example, tenants may divided based on department, user, or location.

Policy catalog 112 may contain a set of policy templates assignable to a tenant. For example, one policy template may specify backup interval, and/or another template may specify a retention interval. In some embodiments, the templates or the policies they define may be grouped together into different service tiers. For example, a gold level tier may comprise a policy template providing daily backups with a two-year retention period, while bronze level tier provides weekly backups with a six-month retention period. These policy templates may also be associated with a monetary cost. For example, the gold tier template may be priced higher than the bronze tier template.

In an embodiment, tenants or a system administrator may access backup management system 102 to instantiate policies from the policy catalog. Once a policy is instantiated for a tenant, it may be associated with the tenant in the tenant list. If the tenant has been subdivided, different policies may be instantiated for and associated with one or more of these subdivisions. As part of the instantiation process, the backup management system 102 may dynamically identify one or more of the backup appliances 100 to implement the policy. Instructions for implementing the policy may be communicated to the appropriate backup appliance(s) via gateway 104 and its constituent facades, as discussed above. Once the appliance has received the policy, it may begin to backup tenant data from a primary storage device in accordance with policy. This process allows the policies to be promulgated to the heterogonous backup appliances from a central location.

In addition to efficiently promulgating policies, the system of FIG. 1 also allows a cloud service provider to modify policy offerings without impacting legacy tenants. For example, a tenant may purchase a gold level policy, which is then instantiated and implemented on backup appliances 100. The service provider may then redefine the gold level policy template. The backup management system will therefore instantiate policies according to the new template for any new tenants. The legacy tenant, however, will continue to receive services according to the old policy since it has already been instantiated and implemented on the appliances.

Figure 3:
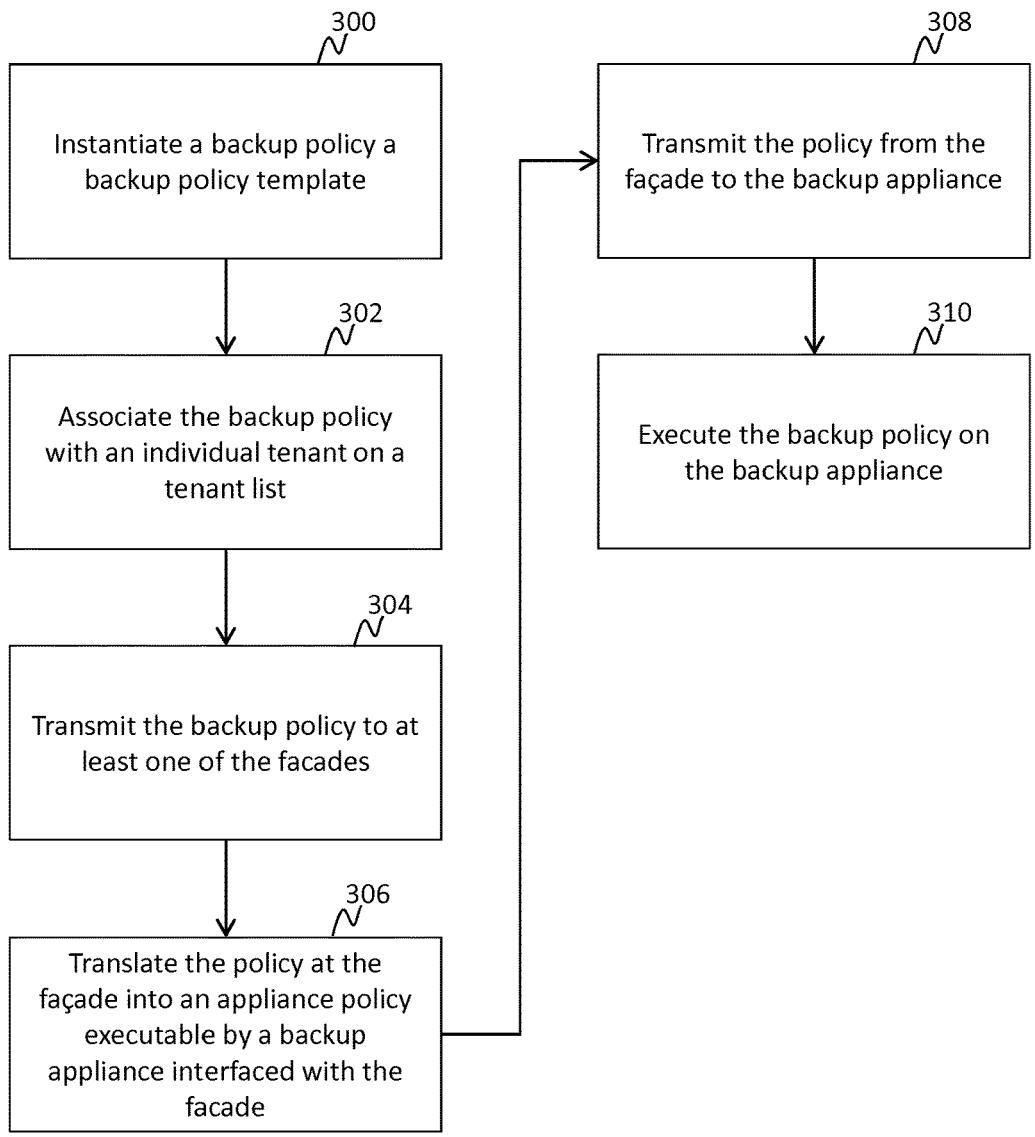
FIG. 3 depicts a flowchart for utilizing backup policies consistent with an embodiment of the present disclosure.

Turning now to FIG. 3, a process for implementing backup policies on heterogeneous backup appliances is discussed. At block 300 a backup policy may be instantiated from a backup template. In an embodiment, the backup template may be selected from and/or defined in a policy catalog, such as policy catalog 112. The instantiation may be in response to a request from a tenant for the backup policy defined in the template.

At 302, the backup policy may be associated with a tenant on a tenant list, such as tenant list 110. For example, the policy may be associated with the tenant requesting the policy.

At 304, the backup policy may be communicated to at least one façade. These facades may be similar to facades 106, and may interface a backup management system with a set of heterogeneous backup appliances.

At block 306, the policy may be translated at the façade into an appliance policy executable by the appliance interfaced with the façade. For example, the façade may translate the policy into a set of instructions for the interfaced appliance's native API.

At 308, the appliance policy may be communicated to the backup appliance, and at 310 the appliance policy may be executed, or implemented, on the backup appliance. For example, the backup appliance may begin backing up the tenant's data from primary storage in accordance with the appliance policy.

Turning again to FIG. 1, the depicted system may also provide tenant security, privacy, and regulatory compliance functionality. Tenants may be reluctant to transition to cloud environments due to data sensitivity. Some tenants may desire or be required to keeps sensitive data logically and/or physically segregated. For example, a hospital storing patient medical records may need to segregate that data to comply with HIPAA regulations. The system of FIG. 1 may segregate data backups to comply with these security, privacy, and/or regulatory compliance policies.

In some embodiments, one or more of the heterogeneous backup appliances may be dedicated to a single tenant. For example, backup management system 102 may associate specific backup appliances with a tenant on tenant list 110. That appliance may be removed from the pool of available backup appliances, and only manage the single tenants backup. Additionally or alternatively, specific storage devices may be associated with a specific tenant. This may provide data segregation since the specified tenant is the only one using that storage, but still allow backup appliances to manage the backups of any tenant.

Figure 4:
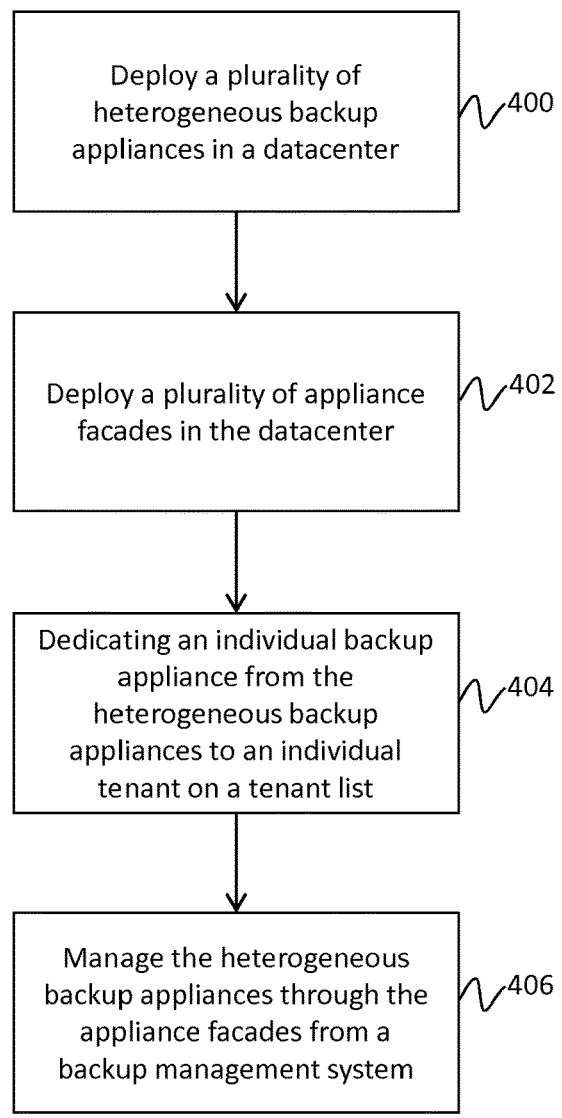
FIG. 4 depicts a flowchart for dedicating backup appliances to tenants consistent with an embodiment of the present disclosure.

FIG. 4 depicts a process enabling data segregation. At 400 and 402, backup appliances and facades may be deployed in a data center. These blocks may be substantially similar to blocks 200 and 202, discussed above. At block 404, an individual backup appliance from the heterogeneous backup appliances may be dedicated to a tenant on the tenant list. Finally, at 406, the backup appliance may be managed from the backup management system.

Figure 5:
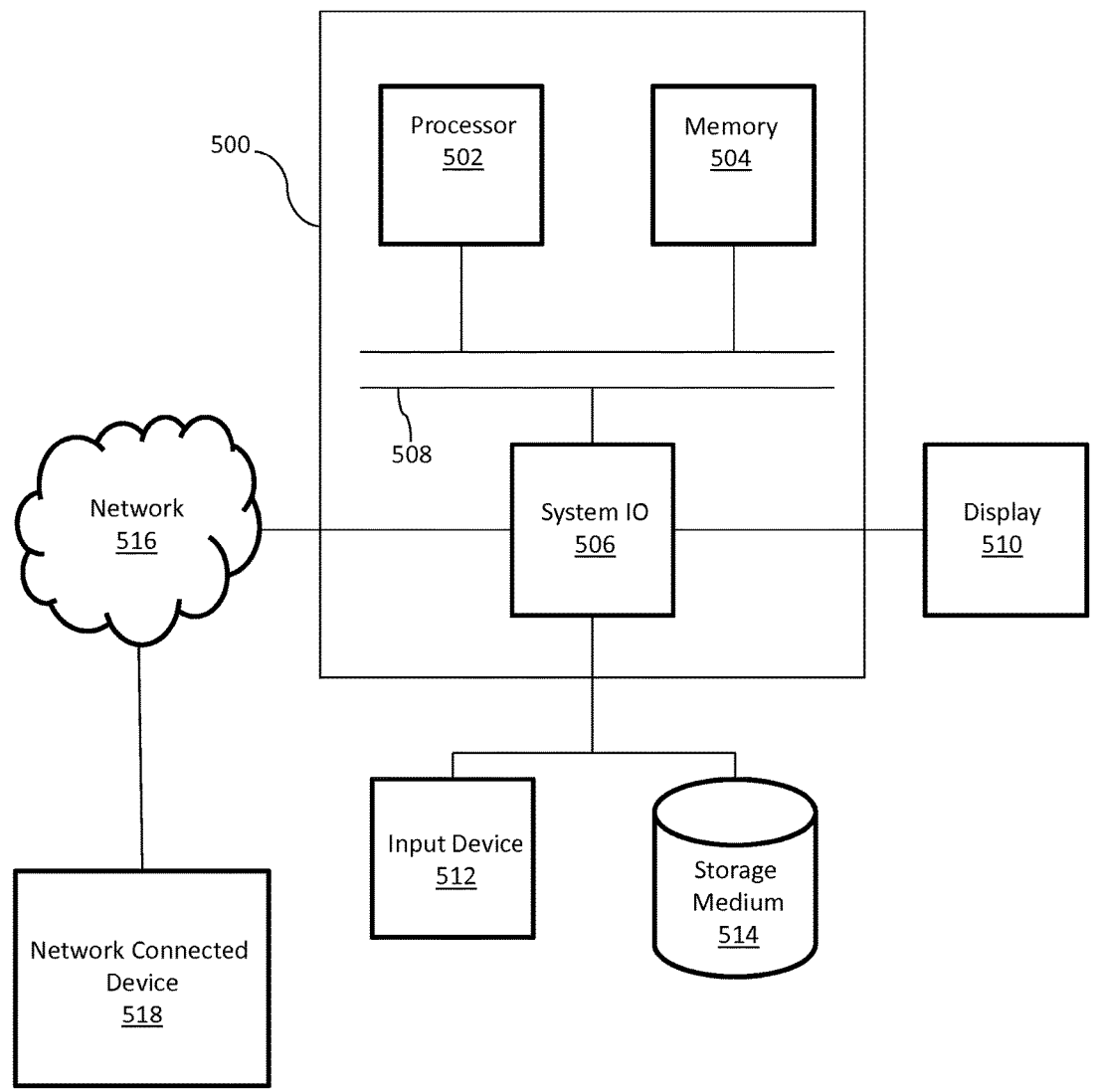
FIG. 5 depicts a general-purpose computer consistent with an embodiment of the present disclosure.

FIG. 5 depicts a computer system which may be used to implement different embodiments discussed herein. General purpose computer 500 may include processor 502, memory 504, and system IO controller 506, all of which may be in communication over system bus 508. In an embodiment, processor 502 may be a central processing unit ("CPU") or accelerated processing unit ("APU"). Some embodiments may comprise multiple processors, or a processor with multiple cores. Processor 502 and memory 504 may together execute a computer process, such as the processes described herein.

System IO controller 506 may be in communication with display 510, input device 512, non-transitory computer readable storage medium 514, and/or network 516. Display 510 may be any computer display, such as a monitor, a smart phone screen, or wearable electronics and/or it may be an input device such as a touch screen. Input device 512 may be a keyboard, mouse, track-pad, camera, microphone, or the like, and storage medium 514 may comprise a hard drive, flash drive, solid state drive, magnetic tape, magnetic disk, optical disk, or any other computer readable and/or writable medium. Storage device 514 may also reside inside general purpose computer 500, rather than outside as shown in FIG. 1.

Network 516 may be any computer network, such as a local area network ("LAN"), wide area network ("WAN") such as the internet, a corporate intranet, a metropolitan area network ("MAN"), a storage area network ("SAN"), a cellular network, a personal area network (PAN), or any combination thereof. Further, network 516 may be either wired or wireless or any combination thereof, and may provide input to or receive output from IO controller 506. In an embodiment, network 516 may be in communication with one or more network connected devices 518, such as another general purpose computer, smart phone, PDA, storage device, tablet computer, or any other device capable of connecting to a network.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for managing backups in a cloud service provider environment, the method comprising:
   deploying a plurality of heterogeneous backup appliances in a datacenter, wherein individual heterogeneous backup appliances comprise a computer processor and are in communication with a computer readable storage medium;
   deploying a plurality of appliance facades, wherein the appliance facades interface the heterogeneous backup appliances with a backup management system, wherein the backup management system comprises a policy catalog containing backup policy templates, wherein the backup management system further comprises a tenant list identifying individual tenants in the cloud service provider environment;
   instantiating a backup policy from at least one of the backup policy templates and associating the backup policy with an individual tenant on the tenant list;
   transmitting the backup policy to at least one of the appliance facades;
   translating the backup policy at the at least one of the appliance facades into a backup appliance policy executable by a backup appliance interfaced with the at least one of the appliance facades; and
   managing the heterogeneous backup appliances through the appliance facades from the backup management system.

2. The method of claim 1, further comprising dedicating an individual backup appliance from the heterogeneous backup appliances to an individual tenant on the tenant list.

3. The method of claim 1, further comprising transmitting the backup appliance policy from the at least one of the appliance facades to the backup appliance.

4. The method of claim 3, further comprising executing the backup policy on the backup appliance, wherein executing the backup policy comprises backing up data belonging to the individual tenant to the computer readable storage medium.

5. A system for managing backups in a cloud service provider environment, the system comprising:
   a plurality of heterogeneous backup appliances, wherein individual heterogeneous backup appliances comprise a computer processor and are in communication with a computer readable storage medium; and
   a plurality of appliance facades operating on at least one computer system, wherein the appliance facades interface the heterogeneous backup appliances with a backup management system, wherein the backup management system communicates with the heterogeneous backup appliances through the appliance facades, wherein the backup management system comprises a policy catalog containing backup policy templates, wherein the backup management system further comprises a tenant list identifying individual tenants in the cloud service provider environment;
   a backup policy instantiated by the backup management system from at least one of the backup policy templates and wherein the backup policy is associated with an individual tenant on the tenant list, wherein the backup policy is transmitted to at least one of the appliance facades, wherein the backup policy is translated by at least one of the appliance facades into a backup appliance policy executable by a backup appliance interfaced with the at least one of the appliance facades.

6. The method of claim 5, wherein the at least one of the appliance facades transmits the backup appliance policy to the backup appliance.

7. The method of claim 6, wherein the backup appliance executes the backup policy, wherein executing the backup policy comprises backing up data belonging to the individual tenant to the computer readable storage medium.

8. A computer program product for managing backups in a cloud service provider environment, the computer program product comprising a non-transitory computer readable medium having program instructions embodied therein for:
   deploying a plurality of heterogeneous backup appliances in a datacenter, wherein individual heterogeneous backup appliances comprise a computer processor and are in communication with a computer readable storage medium;
   deploying a plurality of appliance facades, wherein the appliance facades interface the heterogeneous backup appliances with a backup management system, wherein the backup management system comprises a policy catalog containing backup policy templates, wherein the backup management system further comprises a tenant list identifying individual tenants in the cloud service provider environment;
   instantiating a backup policy from at least one of the backup policy templates and associating the backup policy with an individual tenant on the tenant list;
   transmitting the backup policy to at least one of the appliance facades;
   translating the backup policy at the at least one of the appliance facades into a backup appliance policy executable by a backup appliance interfaced with the at least one of the appliance facades; and
   managing the heterogeneous backup appliances through the appliance facades from the backup management system.

9. The computer program product of claim 8, wherein the backup management system further comprises a tenant list identifying individual tenants in the cloud service provider environment.

* * * * *